United States Patent
Yeh et al.

(10) Patent No.: US 7,181,442 B2
(45) Date of Patent: Feb. 20, 2007

(54) METHOD AND APPARATUS FOR DISCOVERY OF DYNAMIC NETWORK SERVICES

(75) Inventors: Danny Lo-tien Yeh, Mt. Vernon, NY (US); Norman H. Cohen, Suffern, NY (US); Apratim Purakayastha, Yorktown Heights, NY (US); Luke Wong, Norwood, NJ (US)

(73) Assignee: International Business Machines Corporation, Armonk, NY (US)

( * ) Notice: Subject to any disclaimer, the term of this patent is extended or adjusted under 35 U.S.C. 154(b) by 468 days.

(21) Appl. No.: 10/253,278

(22) Filed: Sep. 24, 2002

(65) Prior Publication Data

US 2004/0059722 A1 Mar. 25, 2004

(51) Int. Cl.
*G06F 17/30* (2006.01)
*G06F 15/173* (2006.01)

(52) U.S. Cl. .............................. 707/3; 707/4; 709/225

(58) Field of Classification Search ............... 707/3
See application file for complete search history.

(56) References Cited

U.S. PATENT DOCUMENTS

| | | | | |
|---|---|---|---|---|
| 5,058,108 A | * | 10/1991 | Mann et al. ................. | 370/409 |
| 5,742,667 A | * | 4/1998 | Smith ..................... | 379/112.09 |
| 5,754,939 A | * | 5/1998 | Herz et al. ................. | 455/3.04 |
| 5,835,087 A | * | 11/1998 | Herz et al. .................. | 715/810 |
| 5,933,811 A | * | 8/1999 | Angles et al. ................ | 705/14 |
| 5,946,680 A | * | 8/1999 | Shorter et al. ................ | 707/3 |
| 5,974,451 A | * | 10/1999 | Simmons .................... | 709/218 |
| 5,991,735 A | * | 11/1999 | Gerace ........................ | 705/10 |
| 6,029,195 A | * | 2/2000 | Herz ........................... | 725/116 |
| 6,041,343 A | * | 3/2000 | Nguyen et al. ............. | 709/203 |
| 6,102,969 A | * | 8/2000 | Christianson et al. ....... | 717/146 |
| 6,300,881 B1 | * | 10/2001 | Yee et al. .............. | 340/870.02 |
| 6,307,958 B1 | * | 10/2001 | Deaton et al. .............. | 382/139 |
| 6,308,202 B1 | * | 10/2001 | Cohn et al. .................. | 709/217 |
| 2001/0018674 A1 | * | 8/2001 | Schein et al. .................. | 705/35 |
| 2002/0002509 A1 | * | 1/2002 | Wagorn et al. ............... | 705/26 |
| 2002/0029267 A1 | * | 3/2002 | Sankuratripati et al. .... | 709/224 |
| 2002/0059587 A1 | * | 5/2002 | Cofano et al. ................ | 725/35 |
| 2002/0065713 A1 | * | 5/2002 | Awada et al. ................. | 705/14 |
| 2002/0184086 A1 | * | 12/2002 | Linde .......................... | 705/14 |
| 2002/0188735 A1 | * | 12/2002 | Needham et al. ........... | 709/229 |
| 2003/0018621 A1 | * | 1/2003 | Steiner et al. .................. | 707/3 |
| 2003/0028585 A1 | * | 2/2003 | Yeager et al. ............... | 709/201 |
| 2003/0078918 A1 | * | 4/2003 | Souvignier et al. ........... | 707/3 |
| 2003/0088544 A1 | * | 5/2003 | Kan et al. ...................... | 707/3 |
| 2004/0010520 A1 | * | 1/2004 | Tsang et al. ................ | 707/200 |

\* cited by examiner

*Primary Examiner*—Jeffrey Gaffin
*Assistant Examiner*—Hassan Mahmoudi
(74) *Attorney, Agent, or Firm*—Anne Vachon Dougherty

(57) ABSTRACT

A framework of a service directory that can handle service records changing rapidly is provided by using a content-based routing network. A directory node for providing the service directory is called a data resolver. The data resolver listens for service advertisements for certain service categories from service providers, and stores such advertisement data in the form of service records in a local cache. If a data resolver receives a query for some services, it first looks in the cache. If the cache contains at least one service record that satisfies the query, the data resolver returns the record. Otherwise, the data resolver issues a secondary query corresponding to the query it received, to other data resolvers connected by the content-based routing network. Simultaneously, the data resolver begins listening for service advertisements (service records) from other data resolvers on the content-based routing network.

24 Claims, 7 Drawing Sheets

METHOD AND APPARATUS FOR DISCOVERY OF DYNAMIC NETWORK SERVICES

BACKGROUND OF THE INVENTION

1. Field of the Invention

The present invention generally relates to a computer-based service directory and, more specifically, to a method and system for discovering a service element on a network which can handle continuously updated service records.

2. Description of the Related Art

Service discovery has been a popular subject of interest in computer science in recent years. It started with a simple idea of finding a device, for example, a printer that is nearest to a conference room, and this concept has since expanded to finding web services on the Internet. A Universal Description, Discovery and Integration (UDDI) project provides a framework for describing services, discovering businesses, and integrating business services on the Internet by using a web-based distributed directory. Web Services Description Language (WSDL) is an XML-formatted language used to describe service capabilities as collections of communication endpoints capable of exchanging messages. A directory is generally used to hold service records about the services that are available for a client to use. It normally resides at a well-known network address. The clients, service directories, and service providers may be widely distributed on the network. A service provider is loosely defined to be any software program that provides some form of programming response to a programming request.

A Domain Name Service, or DNS (P. Mockapetris, "Domain Names—Implementation and Specification," IETF Network Working Group Request for Comments 1035, November 1987), is widely used by network programs to find the IP address of a host on an IP network. During the early days of the Internet, static IP addresses were mostly used. A simple view of the DNS is a list of host names and their associated static IP addresses. This list changes as often as hosts are added or removed from the network, which is not too often. When the network administrator starts to run out of static IP addresses, dynamic IP address allocation may be used, in accordance with the Dynamic Host Configuration Protocol, or DHCP (R. Droms, "Dynamic Host Configuration Protocols," IETF Network Working Group Request for Comments 2131, March 1997). Under DHCP, since the association of a hostname to an IP address is no longer static, the hostname-to-IP address list inside the DNS needs be updated whenever an IP address is dynamically assigned to a computer host, an approach known as Dynamic DNS (P. Vixie et al., "Dynamic Updates in the Domain Name System (DNS UPDATE)," IETF Network Working Group Request for Comments 2136, April 1997). In addition to dynamic IP addresses, today's Internet features mobile hosts that connect to the network via the wireless LAN. As a mobile host moves between different IP LAN segments, a new IP address needs be assigned to the mobile host, and this new association needs be reflected in the DNS entry. Thus the frequency of DNS updates has increased by orders of magnitude. Dynamic updates in DNS is designed for the very specific task of mapping a static host name to a dynamic IP address: Whenever a host acquires a dynamic IP address, the host name and the IP address are sent to a domain name server (DNS server) and if necessary this "advertisement" is propagated to other DNS servers. If other hosts on the network ask its DNS for the IP address for this host name, the DNS server returns the right IP address.

In a distributed database system, queries and subqueries are sent from the database manager that received the client's query to other database managers that have the data. However, the network topology in a distributed database system tends to be static, and all the tables are set up by the database administrator beforehand.

The Intentional Naming System (William Adjie-Winoto et al., "The Design and Implementation of an Intentional Naming System," Proceedings of the 17th ACM Symposium on Operating Systems Principles, Dec. 12–15, 1999, Kiawah Island Resort, South Carolina, *Operating Systems Review* 33, No. 5 (December 1999), 186–201) also uses service directories for service discovery, and also uses periodic resending of announcements with expiration times. However, there is no distinction among service categories. All announcements are sent to all service directories. Compared with our invention, this results in more network traffic for the distribution of announcements, and requires larger memory areas since each service directory must cache all unexpired announcements.

The DataSpace project (Tomasz Imielinski and Samir Goel, "DataSpace: Querying and Monitoring Deeply Networked Collections in Physical Space," *IEEE Personal Communications* 7, No. 5 (October 2000), 4–9) uses network-level multicast to distribute queries to service providers. No intermediate service directory is used to mediate the query and the service providers. A multicast group corresponds to a network index, which consists of the physical location of the service provider, and the value of one attribute distinguishing services. However, services having identical values for the network index may belong to different service categories, distinguished by a query involving other attributes. A query is distributed to all members of a multicast group, each of which then evaluates the query to determine whether its service falls within the service category specified in the query. If the service does fall within the specified category, the service provider "reflects" a response back to the requester. This imposes a significant processing overhead on providers of services in un-requested categories, and also entails more network traffic than is needed using our invention. Rapidly changing properties of provided services require the provider to leave and join multicast groups often, which can impose a heavy processing overhead. The query process can be expedited using brokers that cache information about multicast groups in a given physical region, but these brokers must be informed of every change in the membership of a multicast group, thus increasing the overhead involved in leaving and joining multicast groups.

A service directory receives a service query from a client and responds with service records corresponding to services that satisfy the query. Today's typical service directories are optimized to handle high volumes of service queries and low numbers of updates to the service records. However, this usage pattern may change in the near future, so that dynamic service records that change rapidly will increasingly constitute a larger portion of the directory entries in a service directory. One reason for this change is the emergence of a new breed of service providers, who compete with other service providers base on real-time dynamic performance related criteria (e.g., currently available response time of an advertised web service), and these metrics will be continuously updated in their corresponding service records. Another reason for this change is the increase in the number of mobile data sources that appear as service providers in the service directory. An example of mobile data source is a vehicle that outputs its location and velocity information.

These new types of service providers require a service directory that can handle continuous and rapid updates to the service records.

SUMMARY OF THE INVENTION

The invention provides a wide-area service directory that can handle continuously updated service records using a content-based routing network. In this specification, a directory node system for providing the service directory is called a data resolver. The data resolver listens for service advertisements for certain service categories from service providers (or their agents) and other data resolvers, and stores such an advertisement data in the form of a service record in a local cache until lifetime of the advertisement data has elapsed. When a data resolver receives a query for some services, it first looks in the cache, and returns all the service records in the cache that satisfy the query Otherwise, the data resolver publishes a secondary query, corresponding to the query it received, to other data resolvers connected to the content-based routing network. Simultaneously, the data resolver begins the process of receiving responding service records from other data resolvers, either on the content-based routing network or a point-to-point network. When a data resolver receives such a secondary query, and chooses to process it, the data resolver then finds service records in its cache that may satisfy the query, and publishes them to the content-based routing network, or sends them through a point-to-point network like the IP network to the requesting data resolver. The requesting data resolver receives these service records and uses them to resolve the original client query.

The data resolver is designed to return zero or more service records for a given query within a set period of time, and is not designed to guarantee return of all service records in the data resolver network that can potentially satisfy the query. It is assumed that the client that issues the query expects one or more service records, not a complete set of all service records that satisfy the query. Since the service records may contain dynamic information that is rapidly changing, by the time a complete set of the service records is assembled from all the data resolvers on the network, the dynamic information in some of the records in the set could have become obsolete and invalid and, therefore, no longer satisfy the query. Because of this concern, the data resolver network in this invention is designed to return some service records as quickly as possible and forego the completeness of the response.

Whenever a data resolver receives a service advertisement from a service provider (or its agent), it determines whether the advertisement falls within its service categories of interest; if so, then it stores the service advertisement in its cache. At the same time, it publishes this service advertisement to the content-based routing network, so that other data resolvers that are interested in this service advertisement may pick it up and store it in their caches.

Because service advertisements expire, there is no need to issue announcements that a service is no longer provided. Since the service advertisements are reissued periodically, there is no need to take special corrective measures for advertisements that are lost in transmission.

This invention proposes a way to build such a service directory service that is high-performance and scalable. It proposes that each data resolver specialize in a set of service categories, and leverages the scalability, filtering and distribution capability of a content-based routing network to route to that data resolver only those queries and service records that are of interest to it. This design enables our data resolver network to be much more dynamic: New data resolvers can join our network and new types of service advertisements can appear in the data resolver without coordinating with other data resolvers on the network. In addition, robustness of the data resolver network is easily achieved because redundant data resolvers that have the same service categories are permissible under our design.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

As described in the above, the present invention provides a framework for discovering dynamic network services in a scalable way by providing a data resolver. The data resolver listens for service advertisements from the service providers (including advertisements received from agents of service providers, or through other data resolvers), and stores such service advertisements in a cache, in the form of service records that have at least one service category, until their lifetimes have elapsed. In this description, the term "service" can be defined as a functionality offered by a computer system (mainly through a network) to a user to perform a predetermined set of tasks. In the following description, for the purposes of explanation, specific data, numbers, materials and configurations are set forth to provide a thorough understanding of the invention. However, it will be apparent to one skilled in the art that the present invention may be practiced without the specific details.

A. Service Record

A service provider that wants to be found by users of a data resolver network has to submit its service advertisement to at least one data resolver. The advertisement is the means through which the service provider registers the content of its service, and the only means through which that the data resolver can determine that the service provider exists. The data resolver determines if there are service providers that satisfy queries from the users (data-resolver clients) based on the advertisement data. In this embodiment, the service advertisement has two sections. One section contains the description of the service, which is in a form that can be easily parsed and queried by the data resolver. Another section has information on how and where to access the service.

Figure 1:
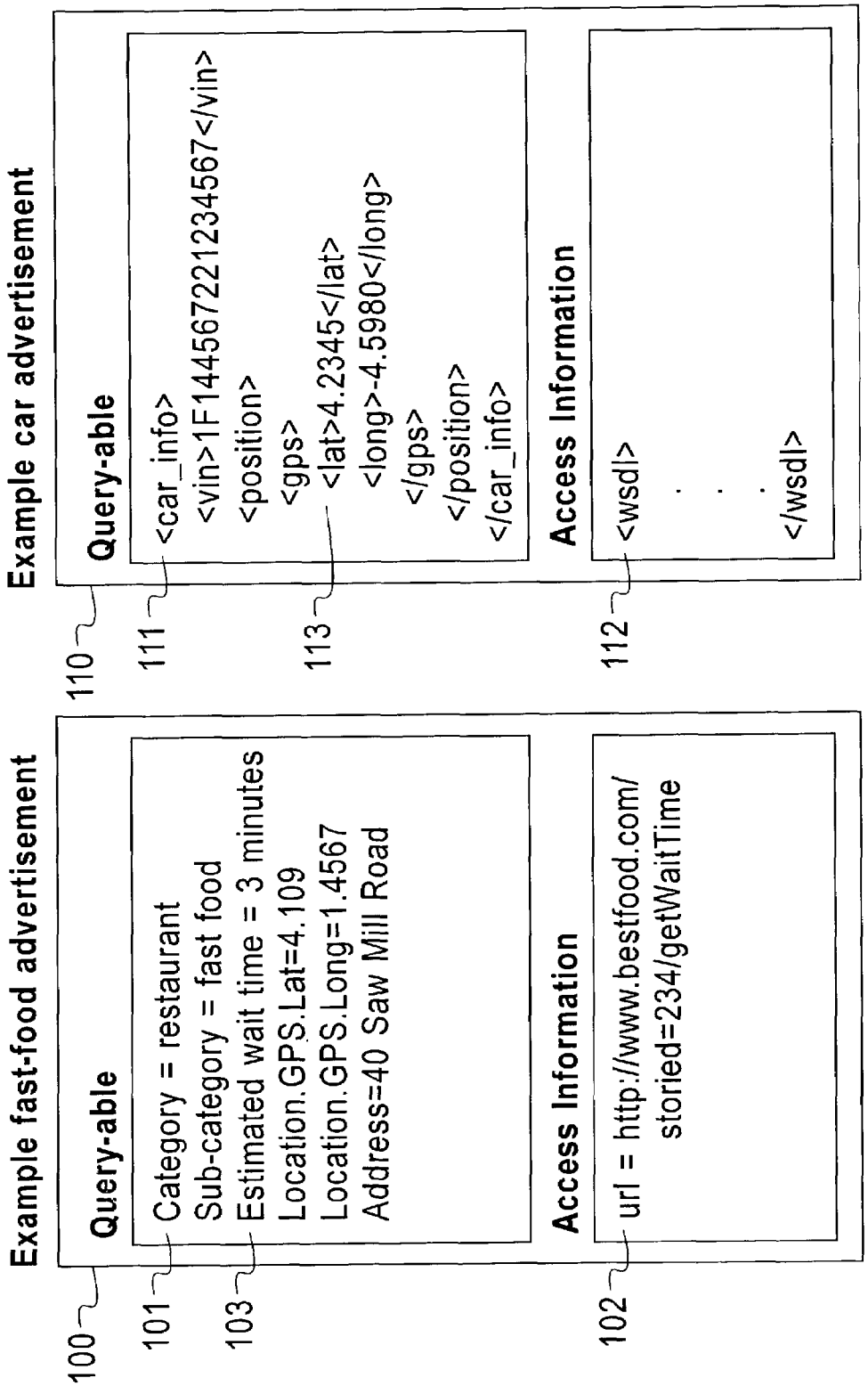
FIG. 1 shows examples of advertisement data.

FIG. 1 shows two examples of the advertisement data, one for a fast food restaurant 100 and another for a car 110. The fast food advertisement 100 shows the queriable section 101 that is expressed in simple name-value pairs, and the access-information section 102 that shows a simple URL string. In this example advertisement, the majority of the name-value pairs are static and remain unchanged over time. However, one name-value pair is dynamic and changes frequently. The TimeToWait data 103 is being updated, for example, once every 30 seconds. In the car advertisement 110, the queriable section 111 is expressed in XML and the access information 112 is a WSDL document. The WSDL document does not need to be embedded in the advertisement, and a URL reference to the document may be sufficient. The dynamic information that changes frequently in the car advertisement 110 is the location of the car 113. The car is a mobile service provider whose location changes, and this change is reflected in its service advertisement once every 10 seconds.

A service record is a superset of the information containing a service advertisement, and it also may have meta data that helps the data resolver during the resolution of a query. This meta data may be added either by the data resolver or by a service provider (or its agent) to give additional hints to the data resolver during its query processing.

B. Data Resolver

The basic function of a data resolver is to efficiently process the query received from users and to store and manage service advertisements obtained from service providers or their agents. One way to implement this function is the traditional approach of using a database system. In order to make the system scalable and robust, a distributed but fully replicated data resolver network is used. Though this fully replicated model is simple, it creates other problems. For example, replication across multiple replicas consumes large amount of bandwidth and directory entries may be out of synchronization between replicas until the next replication time. Alternatively, scalability and robustness can be achieved by using a partially replicated and distributed data resolver network that uses less storage and bandwidth resources without sacrificing the scalability requirement.

The data-resolver network described herein is preferably built using a wide-area content-based routing network. This approach leverages the routing and scalability of the this network.

Figure 2:
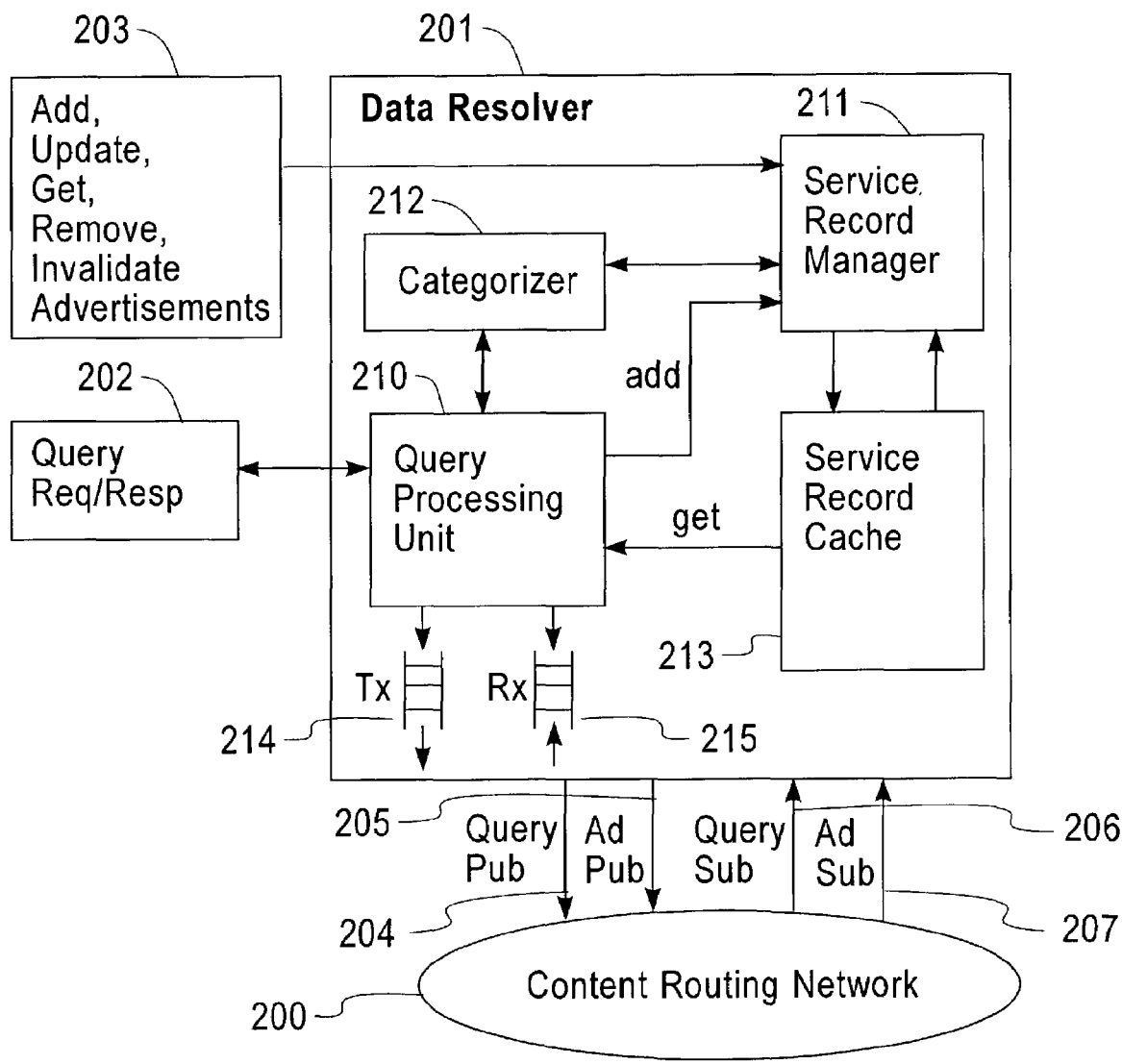
FIG. 2 shows an example configuration of a data resolver.

FIG. 2 shows an example of a configuration of a data resolver. The data resolver 201 is connected to a content-based routing network 200. The data resolver 201 has a query processing unit 210, a service record manager 211, a categorizer 212 and a service record cache 213 that holds the service records. If an overall system supports a queue-based messaging model for transmitting and receiving queries, responses and other messages, the data resolver 201 may contain a transmission queue 214 and a reception queue 215.

The data resolver 201 listens for client queries 202 and service advertisements 203. In this embodiment, it has at least two publishing channels opened to the content-based routing network, one for publishing queries 204 and another for publishing service records 205. The data resolver 201 also has at least two subscription channels opened to the content-based routing network, one for subscribing to query responses 206 and another for subscribing to the service records 207. These are the typical numbers of publishing and subscription channels that are needed by a data resolver to participate in a data resolver network. If necessary, the data resolver can also establish special and temporary publishing and subscription channels for a service category, to leverage the filtering function of the content-based routing network. The use of temporary channels will be described later.

The query processing unit 210 is responsible for controlling the processing of a client query. It parses the client query and extracts a list of key words that are sent to the categorizer 212. The categorizer 212 processes this list of key words and returns a list of service categories. An example of the key words list could be, "restaurant", "fast-food", and "wait time", and a list of possible service categories could be, "restaurant" and "wait time". The query processing unit 210 then fetches from the cache 213 the service records stored under these service categories, and determines whether any of them satisfy the query. This fetch could result in zero cache hits, an empty result set. This could happen either because there are no service records in the service category that satisfy the query, or because the specified service category is not in the cache (in other words, this data resolver does not specialize in this particular service category). In either case, the query-processing unit 210 publishes the query through the query-publishing channel 204. The published query is called a secondary query. The processing steps that follows are described later.

The service-record manager 211 is responsible for managing the service records that are stored in the service-record cache 213. It handles requests from the service providers or their agents. These requests include adding a new service advertisement, and updating, retrieving or removing an existing advertisement. To add a new advertisement, the service-record manager 211 needs to determine the service categories under which this new service record should be stored for future access. It sends the advertisement to the categorizer 212, which returns a list of service categories. The service-record manager then compares this list of service categories with the service categories that it manages, and for each service category that it owns, it stores to the cache a logical copy of the service record that contains the service advertisement. By logical copy, it is meant that there might only be one physical copy of the service record that is shared among the service categories. If the service record manager 211 were to feed the fast food advertisement 100 to the categorizer 212, a possible outcome would be "restaurant" and "wait time". At the same time, for every service advertisement operation 203 that the service-record manager receives, it publishes the operation and the associated service advertisement to the content-based routing network 200, so other data resolvers on the network interested in this service advertisement can receive it. As described hereinafter, if the routing network 200 is realized by a publish-subscribe type network, each data resolver can subscribe to all service advertisements published by other data resolvers, or to a subset thereof in a specific service category. If the advertisements are simply propagated through a multicast network, the service-record manager 211 must filter them in accordance with a predetermined rule, such as filtering based on service category. By this mechanism, each data resolver can have at least partial replication of service records which relate to a specific service category.

New service categories can be introduced into the data resolver through administrator intervention, through an external program that monitors the queries arriving at a particular data resolver, through an adaptive capability built into the data resolver itself, or through a combination of such mechanisms. This built-in adaptive capability resides in the service-record manager 211. When a service-record manager 211 receives too many requests for a service category that it does not manage, it may decide, based on predetermined rules, to specialize in that service category. As a consequence, to conserve system resources like memory or disk space, the adaptive capability may remove service categories in the cache that are no longer to be managed, again based on predetermined rules. How a data resolver populates an empty service category in its cache, and how it bootstraps itself in a data-resolver network, will be described later. The categorizer 212 plays one of the key roles in the overall functionality of the data resolver 201. It functions as a glue that binds the query processing unit 212 and the service-record manager 211. The categorizer 212 provides the structure that the service-record manager 211 uses to organize the service records. It helps the query-processing unit 210 by quickly identifying the service category covering a service record that the query processing unit 210 should access in order to handle the query. The categorizer 212 can be viewed as a highly intelligent hashing agent. The functional scope of the categorizer 212 is limited to the data resolver 201 that it resides on. The categorizer 212 is not visible to the other data resolvers. This means that, in theory, the categorizer 212 in each data resolver 201 could be different. For the same key words list and service advertisement, categorizers from different data resolvers can generate lists with different categories on them. This feature gives the data resolver the freedom to organize its service records in the cache any way it wants, and it also makes it unnecessary for all data resolvers on the same content-based routing network to agree to a common set of service categories in order to work together. Alternatively, all data resolvers on the data resolver network can have identical categorizers whose outputs are the same for the same input. In practice, the categorizers 212 in data resolvers that are connected to the same content-based routing network do share well known service category names (for example, common names like "restaurants" and "gas station", and XML schema names). Service-category naming conventions enable the data resolvers to exchange information through the publishing and subscription channels of the content-based routing network. The service providers would also be expected to adhere to these conventions, using well-known service-category names in the service advertisements that they send to the data resolver.

Figure 3:
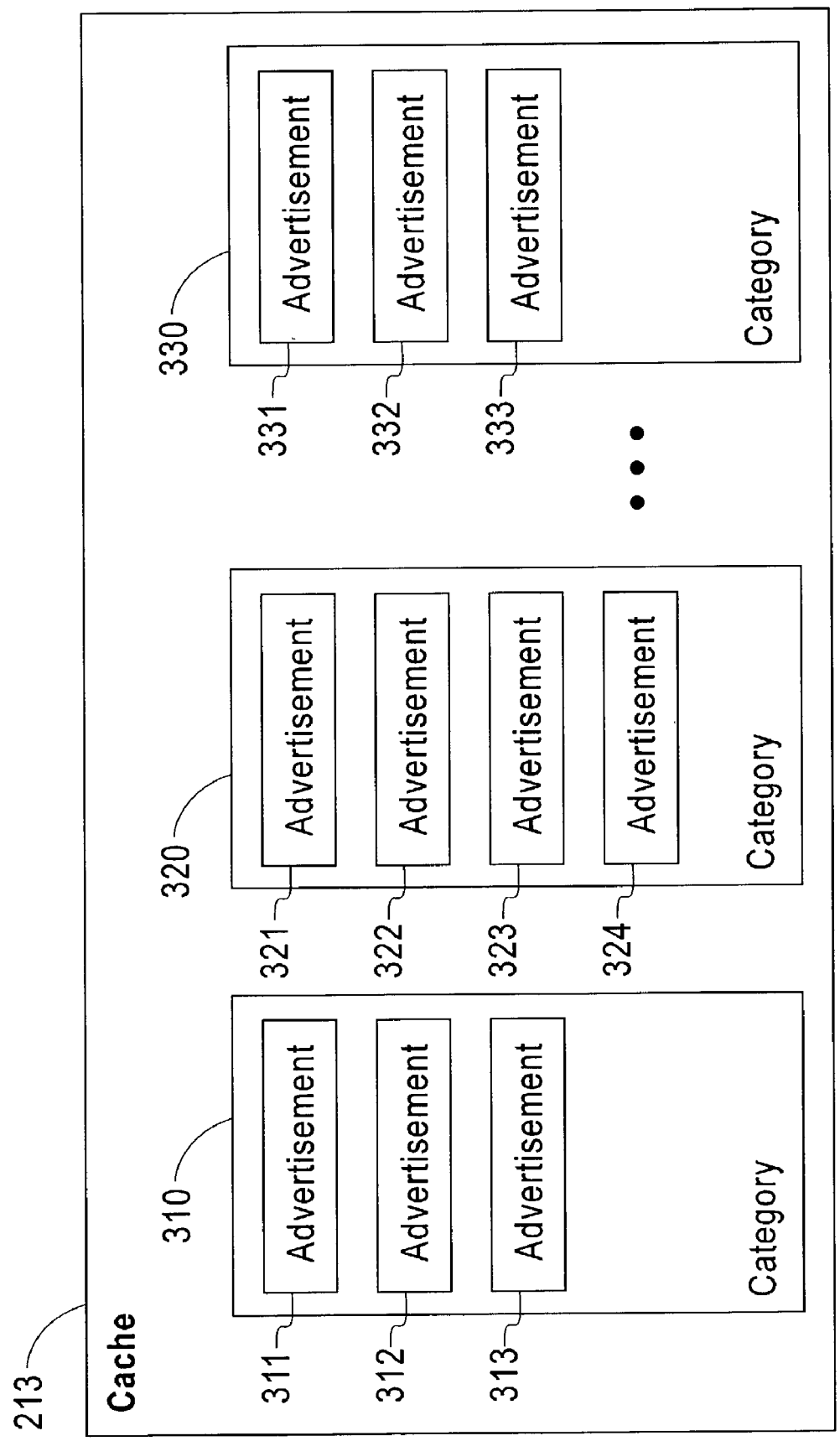
FIG. 3 shows an example configuration of a service record cache in the data resolver.

FIG. 3 shows an example of configuration of the service record cache 213. The service record cache 213 is a storage for storing service records and could be implemented using a volatile memory, persistent storage or combination of both. The service records (311–313, 321–324, 331–333) in the cache 213 are organized and stored in association with the service categories (310, 320, 330) that they belong to.

C. Data Resolver Network (Routing Network)

As described in the foregoing, the present invention builds a better service directory using a content-based routing network to scale the handling of a large number of client queries and service-advertisement updates. It is noted that the main purpose of any service directory is to find a list of service providers' advertisements (service records) that satisfy a client's query for a service. A content-based routing network is simple means to achieve this result where there are a large number of client queries and service advertisements are being updated rapidly.

Figure 4:
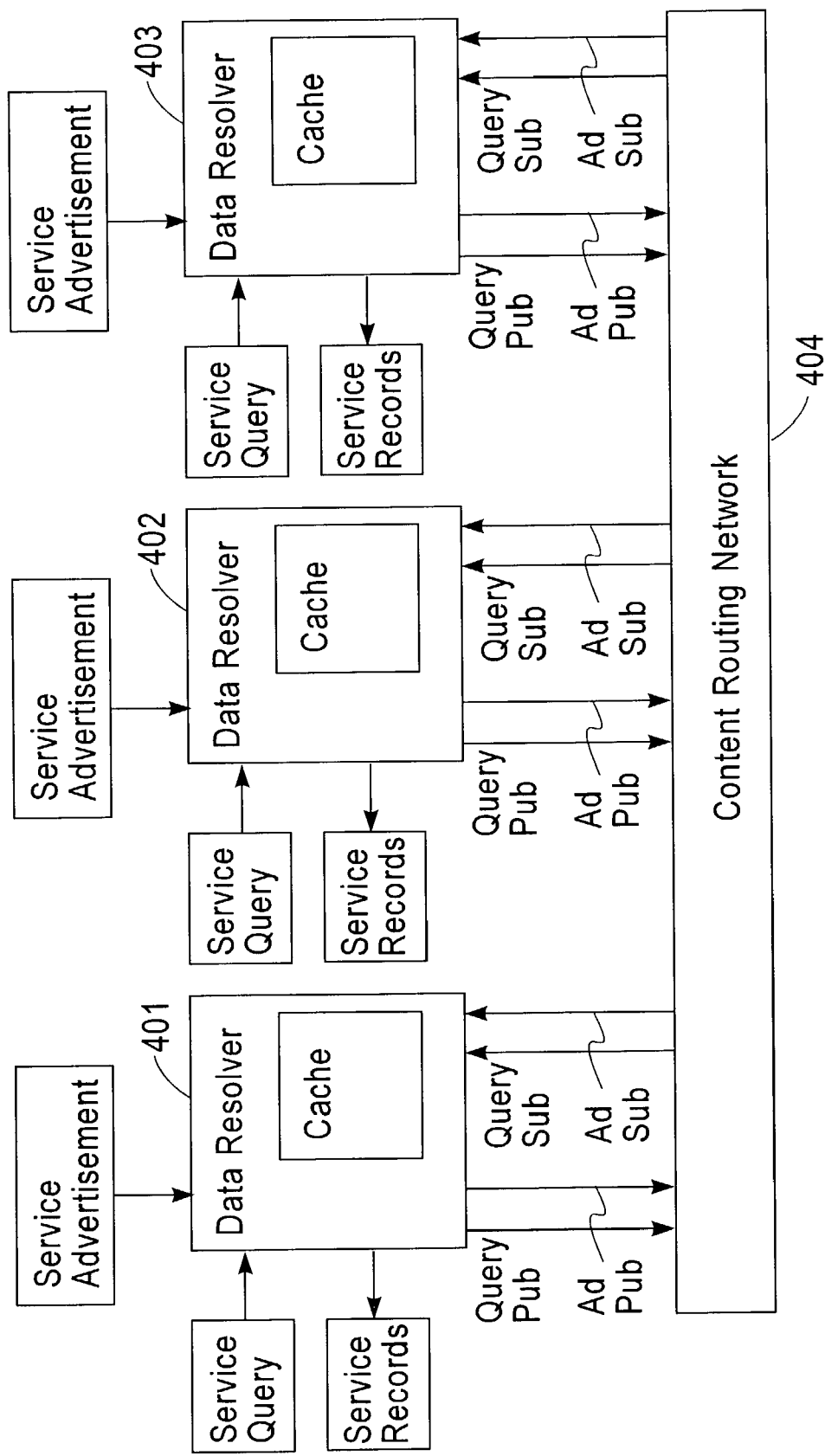
FIG. 4 shows an example configuration of a data resolver network.

FIG. 4 shows an example configuration of a data resolver network. The data resolvers (401, 402, 403) are connected through a content-based routing network 404 which routes message from the sender to the receivers based on the content of the message, as opposed to the destination network address. A typical example of a content-based routing network is a publish-subscribe messaging system. The design pattern of a publish-subscribe messaging system is consumer-broker-producer, in which the data resolver (401, 402, 403) acts as both a consumer and a producer of messages. Both the secondary query and service record described in earlier sections are simply messages to the publish-subscribe messaging network. One of the features of this system is the decoupling of consumers (subscribers) of messages from producers of messages (publishers). This means that the producer of a message does not know the network addresses nor the number of the consumers before it transmits the message into this network, and conversely, a consumer of the message does not know where and when the message is being generated before it connects to the network and listens for it. The consumers and the producers are related to each other by the topic of interest, for example, "restaurants", "gas stations" or "car_info". A message broker in the middle performs the task of matching the producers to the consumers that share the same interests (in our case, the names of the service categories). All that is required for two parties is that they register these names of interest with a message broker. Typically, this message broker also accepts a conditional filter from a message consumer that filters the messages before they are sent to a message subscriber (consumer). The connection between publishers (producers) and the broker may be implemented with point to point unicast network like TCP/IP, and the connection between the broker and the subscribers (consumers) may be implemented in variety of ways, such as point-to-point unicast, multicast, broadcast or a combination thereof. One way to scale a content-based routing network is with a federation of interconnected message brokers. In addition, some implementations of content-based routing networks may provide robust communication, by reducing the likelihood that messages will be lost in transmission. The following description explains how this data resolver network handles the two usage operations, client query and service advertisement (service record).

D. Client Query

Referring now to FIG. 2, the data resolver 201 receives a client service query 202 and it resolves this query to one or more service records located in its local cache 213, then it responds with the matching service records. If the data resolver 201 finds no service records in its cache to satisfy the query because its cache does not have the requested service category, then it has to get the service records from other data resolvers that specialize in the specified service category. It then publishes the query to the content-based routing network 200 through its query publishing channel 204, and listens to the query subscription channel 206 for a period of time for any responses to this query publication. If responses are forthcoming, the data resolver 201 may decide to store these service records in its local cache 213 for later usage or it may discard it to conserve a storage. Any duplicate service records are eliminated by the data resolver 201.

Figure 5:
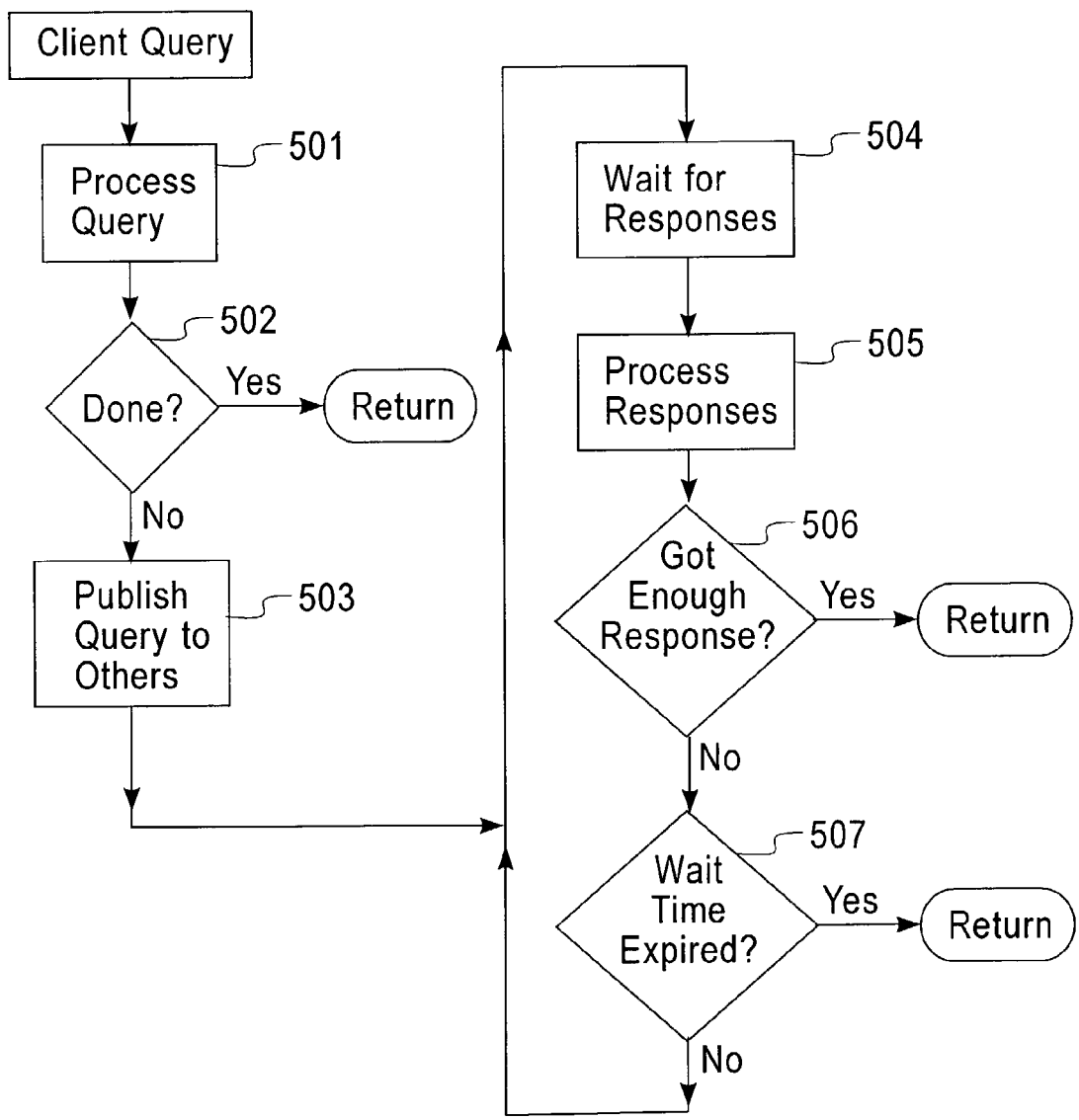
FIG. 5 shows an example of a flow diagram for processing a client query.

FIG. 5 shows an example of a flow diagram for processing a client query. The data resolver 201 starts to process a client query (Step 501). The data resolver 201, specifically the query processing unit 210, looks into the local cache 213 to determine if it has service records that satisfy the query (Step 502). If one or more service records are found, then these records are returned to the client. If no records are found, then the client query is published to the content-based routing network 404 (Step 503). The data resolver 201 then waits for responses (i.e. service records) from the other data resolvers on the content-based routing network (Step 504).

If the response arrives, the data resolver 201 checks the response to see if it has been processed by the other data resolver or if it is unprocessed (Step 505). If the response has been processed, then the data resolver 201 puts the service record in its result set. If the response has not been processed, the data resolver 201 processes it to determine if it satisfies the client query. In either case, the data resolver 201 may decide to store the service record in its cache 213 or to discard it. The policy that the data resolver 201 uses to decide which service records should be stored may be set by an administrator of the data resolver or by some heuristic algorithm. For example, if the number of client queries for a certain category of service records that are not normally saved in the cache 213 is getting greater, the data resolver 201 may react by starting to save these records in its cache 213, to improve the future performance of handling the client queries in this category.

After processing each service record, the data resolver 201 checks to see if it has reached a predetermined threshold, such as a maximum number of service records, or if it has a minimal number of service records sufficient to satisfy the query (Step 506). If both conditions are false, the data resolver 201 then checks the time-out timer to determine if enough time has been spent waiting for the responses to come back (Step 507). If the waiting time has expired, the data resolver 201 returns the gathered service records to the client. The expiration timer can be implemented as a separate thread so that it can run in parallel to the processing of the returning service records.

A usage example of the data resolver 201 is described as follows. A client sends a query to the data resolver 201 asking, "Find me all fast food restaurants within one mile from where I am whose wait time is less than 5 minutes". This query is encoded in some query language that a data resolver 201 understands and is sent to a data resolver 201 that the client knows about. However, the data resolver 201 might not contain the service records, or might not specialize in the fast-food-restaurant category that this query is asking about. This data resolver 201 then publishes this query to other data resolvers. Data resolvers that can answer this query respond with processed or unprocessed service records. The original requesting data resolver 201 then builds a resulting set of service records from these records and returns them to the client. Since the dynamic information (e.g., waiting time at the restaurant) is encoded inside the service advertisement, the service records returned to the client are guaranteed to meet the querying conditions, and the client does not need to poll the restaurant to find out its waiting time. Thus, incorporating dynamic information inside the service advertisement allows the data resolver query processing unit 210 to filter out those services that do not meet the querying condition, and it makes it unnecessary for the client to poll the restaurant for its current waiting time.

E. Inter-Data-Resolver Query

A data resolver may receive a secondary query from another data resolver. As described in the foregoing, if the content-based routing network is realized by a publish-subscribe type network, each data resolver can subscribe to all queries published by other data resolvers, or to a subset thereof in a specific service category. When a data resolver 201 receives a query on its query subscription channel 206 from another data resolver, it can choose one of three ways to respond. The data resolver 201 may:

1. Return only those service records that satisfy the query, or
2. Return all service records in the given service category without examining (processing) the individual service records in detail, or
3. Return nothing because it is busy.

If the data resolver 201 chooses to be a "good neighbor," and sends back the service records to its neighbor, another problem arises when too many good-neighbor data resolvers respond with the same set of service records for the same query. The requesting data resolver might be flooded with multiple copies of the same service records. One solution is to let the requesting data resolver sort out the duplicates and eliminate them. Another solution, which does not eliminate the problem totally but can alleviate this potential bad condition, is for the responding data resolvers to do the following steps.

Figure 6:
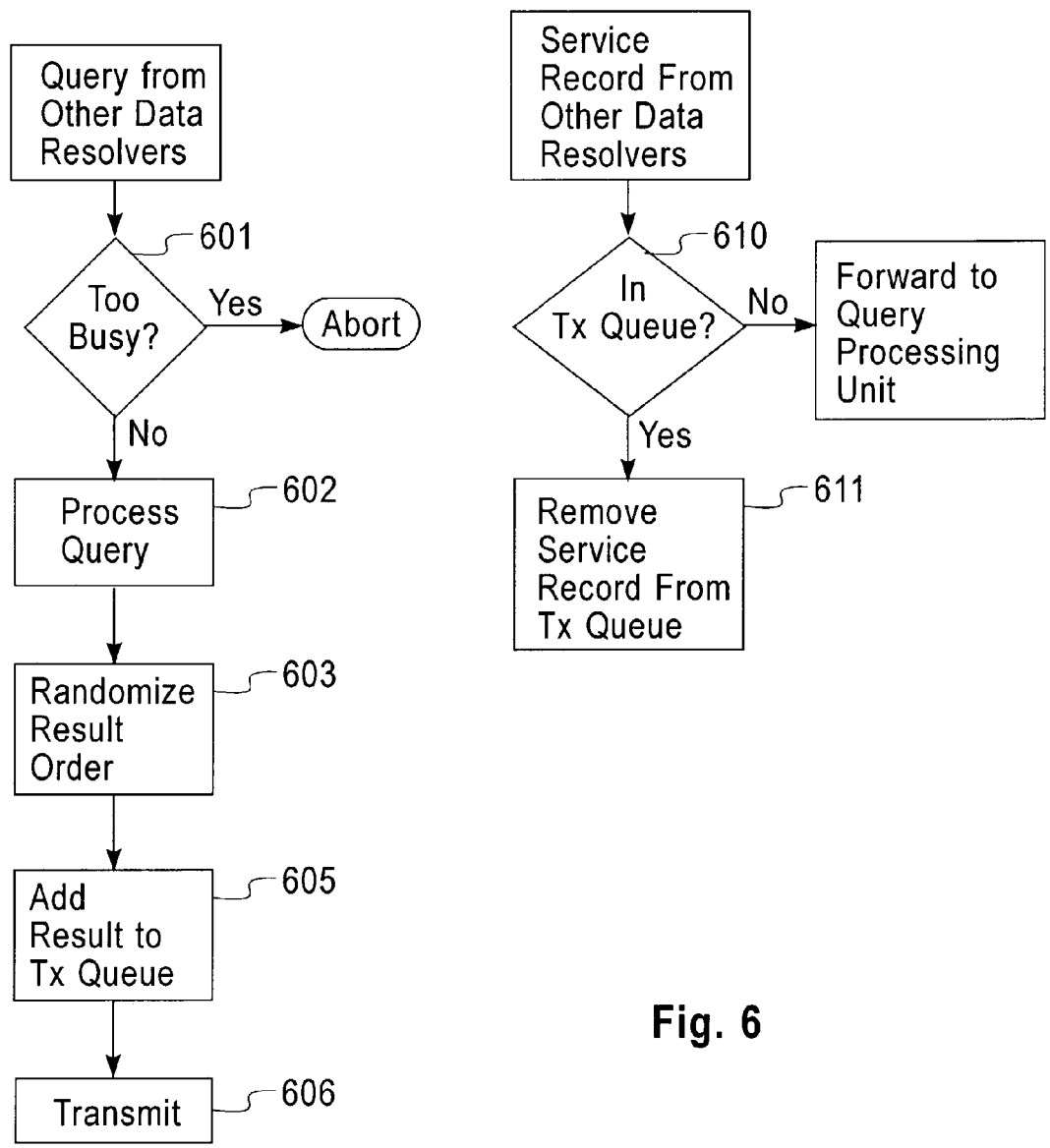
FIG. 6 shows an example of a flow diagram for processing queries and service records received from other data resolvers.

FIG. 6 shows an example of a flow diagram for processing secondary queries received from other data resolvers. If the data resolver 201 is not busy and decides to process the secondary query (Step 601), it handles the query to create a resulting set of service records (Step 602) and preferably randomizes the order of the service records before publishing them through transmission queue 214 to the content-based routing network (Step 603). This randomization of the service records before transmission to the requesting data resolver will tend to maximize the number of distinct service records received by the requester over a period of time. Since each data resolver runs independently of the others, and does not communicate with other data resolvers with the same service categories to coordinate a duplicate-free collection of service records to return to the requesting data resolver, the next best thing it can do to reduce the number of duplicate service records that are sent back is not to transmit those service records that other data resolvers have already transmitted. It does this by monitoring all service records that it receives in its receiving queue 215, where service records from its subscription channel 207 are queued. If the data resolver detects a service record in its receiving queue 215 that is equivalent to a service record in its transmission queue 214 (Step 610), then the service record in transmission queue 214 is deleted (Step 611). After this randomization process, the responding data resolver sets a resulting set of service records in its transmission queue 214 (Step 605) and transmits it to the requesting data resolver (Step 606). Since there is latency in the content-based routing network, transmission of duplicate service records can still happen. Therefore, the requesting data resolver must still be prepared to handle duplicate service records.

F. Distribution of Service Records

Figure 7:
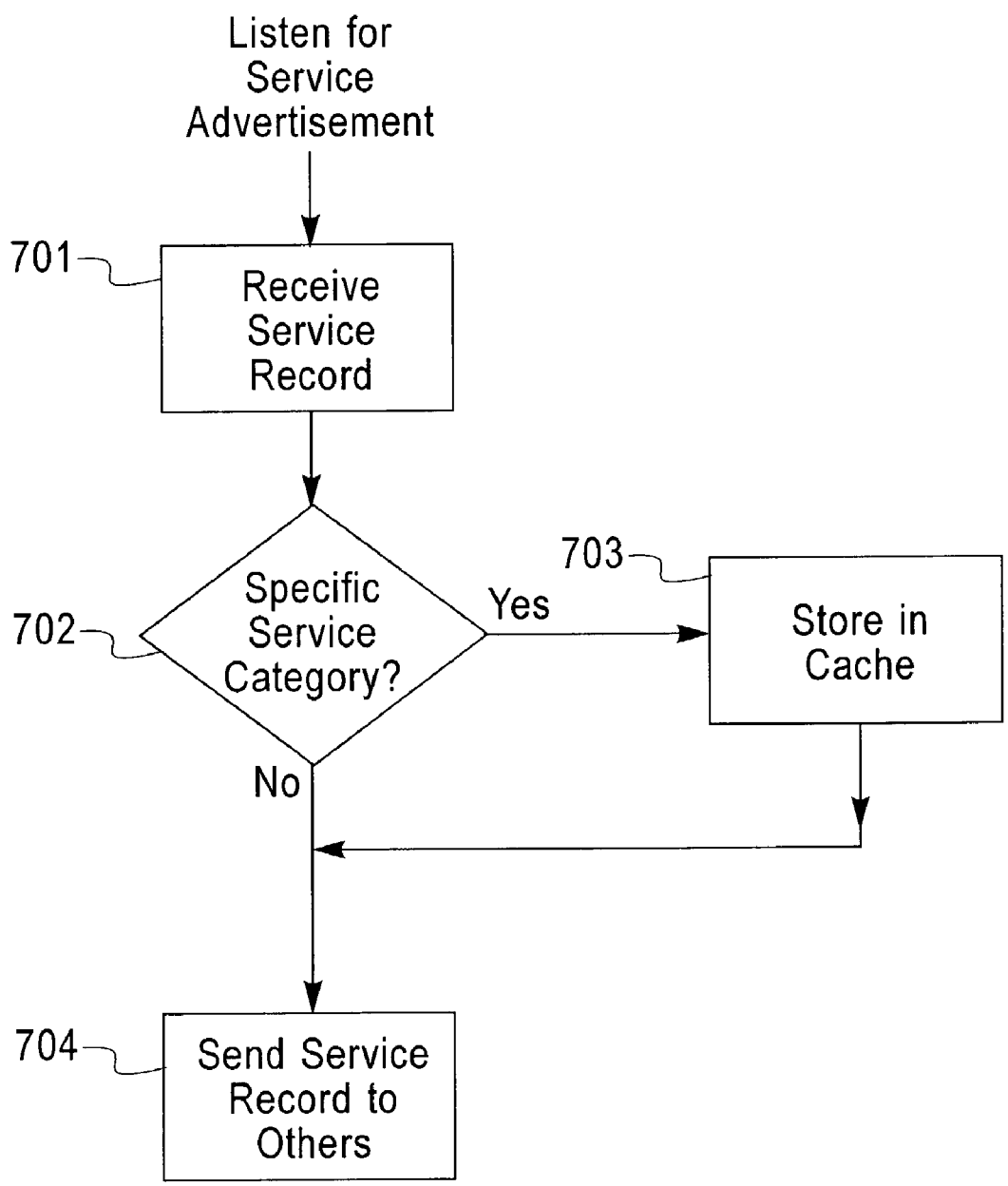
FIG. 7 shows an example of a flow diagram for processing service records received from a service provider.

FIG. 7 shows an example of a flow diagram for processing service records received from a service provider. The data resolver 201 listens for service advertisements from service providers (including their agents). The advertisement data are managed in the form of service records in the data resolver 201. Whenever the data resolver 201 receives a service record from a service provider (including its agent) or other data resolvers through the routing network 404 at Step 701, the data resolver 201, specifically the service record manager 211, determines if such service record falls within at least one specific service category that the data resolver 201 manages (Step 702). If there is at least one specific service category which corresponds to the received service record, then the service record manager 211 stores it in its cache 213 for each service category (Step 703). At the same time, the service record manager 211 sends this service record to the other data resolvers by publishing to the routing network 404 (Step 704). As described above, if the routing network 404 is realized by a publish-subscribe type network, other data resolvers that are interested in the service record belonging to such specific service category may pick up and store it in their cache. Each data resolver on the routing network 404 can receive the service record by subscribing to receiving the service records in a service category of its interest that were published by other data resolvers. By this mechanism, each data resolver can have at least partial replication of service records which relate to a specific service category.

G. Service Category Specification

The contents of the cache 213 in the data resolver 201 is neither required nor expected to be the same across the data resolvers. This means that different data resolvers can be configured to specialize in different service categories (for example, fast food restaurants, baseball, local news, or local weather). If a data resolver 201 receives a client query that does not fall within its specialty, it simply publishes it to the content-based routing network 200 and relies on other data resolvers to send back the service records that satisfy the query. The data resolver can take advantage of the filtering capability of the content-based routing network to efficiently achieve this specialization of service categories.

Each data resolver 201 may open a single subscription channel to the content-based routing network that listens for all queries, or it may open one or more subscription channels, each of which listens for queries with a specific service category. If the data resolver 201 uses a single general-purpose query subscription channel, then it is responsible for sorting all the queries it receives. If the data resolver 201 uses subscription channels that are more narrowly defined, it is leveraging the content routine network to do the bulk of filtering, and it receives only those queries that it is interested in. Whenever the data resolver 201 accepts a query of interest, the steps described in the flow charts of FIG. 6 applies; the data resolver looks in its local cache 213 for service records that satisfy the query, and publishes those service records to the content-based routing network 200 via its service record publishing channel 205.

The data resolver 201 may set up a temporary query subscription channel 206 with the content-based routing network 200 to handle the responses to the secondary queries it has published. This information can be specified in the secondary query when it is published so that potential responders (data resolvers) to this query can send their responses back to this temporary subscription channel. By doing this, the content-based routing network 200 can sort out the query responses as oppose to the requesting data resolver.

H. Populating a Service Category

When a new service category is introduced into the data resolver, the cache has no service records under this new service category. One way to populate this service category is to issue a secondary query to the content-based routing network asking for service records in this service category. Those data resolvers that specialize in this service category would send the service records to the requesting data resolver. This same procedure is used when a data resolver starts up with an empty cache and joins a data resolver network.

What is claimed is:

1. A method implemented in a computer system acting as a directory node, connected to a network, said method comprising the steps of:

receiving a query from a user requesting information for a service, the query specifying a service category associated with the service;

determining, based on the service category, if there is at least one stored service record of at least one service provider having an associated service category that satisfies the query, wherein each service record comprises at least service description information and access information and wherein said stored service record is selected for storage by comparing said service description information to said associated service category; and communicating to the user one or more service records associated with the service, in response to said determining step.

2. The method of claim 1, said communicating step further comprising the step of:

forwarding the query to one or more other directory nodes over the network, responsive to a determination that there is no service record satisfying the query.

3. The method of claim 2, wherein the network is adapted to a publish-subscribe type of communications, and said forwarding step further comprises the step of publishing the query to subscribers.

4. The method of claim 2, further comprising the step of:

receiving responses including one or more service records from the one or more other directory nodes over the network.

5. The method of claim 4, wherein the service records received from the one or more other directory nodes are randomized to reduce the likelihood of duplication by the one or more other directory nodes.

6. The method of claim 1, wherein the query is forwarded from one or more other directory nodes over the network; and said directory node performs said determining step and said communicating step to the other directory nodes based on the service category specified in the query.

7. The method of claim 6, wherein the network is adapted to a publish-subscribe type of communications, and the query is forwarded to said directory node by its subscribing to receive queries in the associated service category.

8. A method implemented in a computer system acting as a directory node, connected to a computer network, to manage service records in at least one specific service category, said method comprising the steps of:

receiving, at said directory node, an advertisement for service including a service record from a service provider, said service provider being remote from said directory node and the service record specifying at least one service category, wherein each service record comprises at least service description information and access information;

determining if a specified service category is within the scope of at least one specific service category for which said directory node manages service records which are transmitted to a requesting user, wherein said determining comprises comparing service description information with said at least one service category; and storing the service record at said directory node, responsive to a determination that the specified service category is within the scope of said at least one specific service category.

9. The method of claim 8, wherein said directory node is connected over the network to one or more other directory nodes, further comprising the step of:

sending the service record to the one or more other directory nodes over the network.

10. The method of claim 9, wherein the network is adapted to a publish-subscribe type of communications, and said sending step further comprises the step of sending the service record by publishing the service record to the network.

11. The method of claim 8, wherein the network is adapted to a publish-subscribe type of communications, and said receiving step further comprises the step of:
receiving the service record from said service provider over the network by subscribing to receive service records associated with said at least one specific service category.

12. The method of claim 8, further comprising the steps of:
receiving a query from a user requesting information for a service, the query specifying a service category associated with the service;
determining, based on the service category specified in the query, if there is at least one stored service record having an associated service category that satisfies the query; and
communicating to the user one or more service records associated with the service, in response to said determining step whereby said user may contact one or more than one service provider using said access information from said one or more service records to obtain said service.

13. An apparatus acting as a directory node, connected to a computer network, to manage service records, said apparatus comprising:
a storage to store a service record received from a service provider, the service record comprising at least service description information and access information and relating to at least one service category which is within the scope of at least one specific service category for which said directory node manages service records; and
a service record manager to manage the service record stored in the storage in association with said at least one specific service category, wherein said manager comprises a categorizer and comparison component to determine if a received service record relates to a service category which is within the scope of at least one specific service category that is managed by said directory node by comparing said service description information to said at least one specific category; and
a communicator to communicate to the user one or more service records associated with the service, in response to said determining step.

14. The apparatus of claim 13, wherein said directory node is connected over the network to one or more other directory nodes, and said service record manager sends the service record to the one or more other directory nodes over the network.

15. The apparatus of claim 14, wherein the network is adapted to a publish-subscribe type of communications, and said service record manager sends the service record by publishing the service record to the network.

16. The apparatus of claim 13, wherein the network is adapted to a publish-subscribe type of communications, and said service record manager receives the service record from the service provider over the network by said service record manager subscribing to receive service records associated with said at least one specific service category.

17. The apparatus of claim 13, wherein said directory node is connected over a network to one or more other directory nodes, and said storage stores a subset of all service records stored in said one or more other directory nodes.

18. The apparatus of claim 13, further comprising:
a query processing unit for performing the steps of receiving a query from a user requesting a service, the query specifying at least one service category associated with the service; determining, based on the specified service category, if there is at least one service record being stored in the storage and having an associated service category that satisfies the query; and communicating to the user one or more service records associated with the service, in response to the determining step, whereby said user may contact one or more than one service provider using said access information from said one or more service records to obtain said service.

19. The apparatus of claim 18, wherein said query processing unit further performs the step of forwarding the query to one or more other directory nodes over the network, responsive to a determination that there is no service record satisfying the query.

20. The apparatus of claim 19, wherein the network is adapted to a publish-subscribe type of communications, and said forwarding step further comprises the step of publishing the query to subscribers.

21. The apparatus of claim 19, wherein said query processing unit further performs the step of receiving responses including one or more service records from the one or more other directory nodes over the network.

22. The apparatus of claim 21, wherein the service records from the one or more other directory nodes are randomized to reduce the likelihood of duplication by the one or more other directory nodes.

23. The apparatus of claim 18, wherein the query is forwarded from one or more other directory nodes over the network; and said query processing unit performs said determining step and said communicating step to the other directory nodes based on the specified service category.

24. The apparatus of claim 23, wherein the network is adapted to a publish-subscribe type of communications, and the query is forwarded to said directory node by its subscribing to receive queries in said at least one specific service category.

* * * * *